United States Patent
Watanabe et al.

(10) Patent No.: US 6,817,467 B2
(45) Date of Patent: Nov. 16, 2004

(54) CONVEYOR DRIVE SYSTEM AND MOTOR BUILT-IN REDUCER THEREFOR

(75) Inventors: Hiroshi Watanabe, Tajimi (JP); Kiyoji Minegishi, Aichi (JP); Jun Tamenaga, Obu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 6 days.

(21) Appl. No.: 10/321,715

(22) Filed: Dec. 18, 2002

(65) Prior Publication Data

US 2003/0132088 A1 Jul. 17, 2003

(30) Foreign Application Priority Data

Dec. 18, 2001 (JP) ........................................ 2001-385193

(51) Int. Cl.[7] .......................... B65G 23/00; B65G 23/04
(52) U.S. Cl. ........................................ 198/832; 198/835
(58) Field of Search ............................ 198/832, 832.1, 198/835; 475/178, 183, 337

(56) References Cited

U.S. PATENT DOCUMENTS

| | | | | |
|---|---|---|---|---|
| 3,668,485 A | * | 6/1972 | Norris | 318/102 |
| 4,561,326 A | * | 12/1985 | Hamabe et al. | 475/184 |
| 4,918,344 A | * | 4/1990 | Chikamori et al. | 475/183 |
| 6,420,807 B1 | * | 7/2002 | Tsujimoto et al. | 310/83 |

* cited by examiner

Primary Examiner—Gene O. Crawford
(74) Attorney, Agent, or Firm—Squire, Sanders & Dempsey L.L.P.

(57) ABSTRACT

A compact conveyor drive system which prevents resonance-induced noise and vibration caused by a polygonal motion observed in transmission gearing. The conveyor belt of the conveyor is driven through a chain trained over a driven sprocket mounted to the shaft of a drum and a drive sprocket on the side of a motor. The drive system is a motor built-in reducer, and a simple planetary roller mechanism is employed for the reducer. This enables the diameter of the sprockets to be made smaller. The motor generates lower vibration, while providing sufficient torque.

6 Claims, 9 Drawing Sheets

CONVEYOR DRIVE SYSTEM AND MOTOR BUILT-IN REDUCER THEREFOR

BACKGROUND OF THE INVENTION

1. Field of the Invention

The present invention relates to conveyor drive systems, in particular, to a conveyor drive system with lowered vibration, noise, or pulsation, and a motor built-in reducer used for the conveyor drive system.

2. Description of the Related Art

FIG. 9A is a top plan view and FIG. 9B is a front view of a prior art conveyor drive system, in which the reference numeral 100 denotes a conveyor and the reference numeral 200 denotes a drive system therefor.

The conveyor 100 includes a bed 101, a pair of drums 102 rotatably supported at both ends of the bed 101, and an endless conveyor belt 103 trained over both drums 102. The drawings illustrate only one end of the bed 101 and one of the drums 102. A driven sprocket 104 is coupled to the shaft of the illustrated drum 102, so that the drum 102 is driven by a geared motor 201 via a chain 105 trained over the driven sprocket 104. The reference numerals 106, 107, and 108 in the drawings represent an object being transported, rollers, and a support leg, respectively.

The drive system 200 includes the geared motor 201 having an output shaft 222 to which a drive sprocket 203 is mounted. The endless chain 105 is trained over this drive sprocket 203 and the driven sprocket 104 of the conveyor 100. The reference numeral 204 represents a base. The support legs 108 of the conveyor 100 are joined to this base 204.

The geared motor 201 consists of a motor 210 and a reducer 220. The reducer 220 may be, for example, a planetary gear reducer disclosed in Japanese Patent Laid-Open Publication No. Hei. 8-4844, a parallel shaft gear reducer using helical gears, or an orthogonal gear reducer using hypoid gears proposed by the applicants of the present invention disclosed in Japanese Patent No. 2628983. In the applications where a low noise, low vibration environment is particularly desirable, it is the practice to use a reducer employing a helical gear set or an orthogonal gear reducer employing a hypoid gear set.

For example, in the application as an inspection conveyor for the visual checking for any small foreign matter in a food product package, it is highly desirable to suppress vibration or pulsation of the conveyor belt as much as possible.

While the demand for such conveyor has been growing, no improvements have been made so far that address this problem.

SUMMARY OF THE INVENTION

The present invention has been devised under these circumstances, taking account of the problems caused by vibration, noise, or pulsation in conveyors. An object of the invention is to provide a conveyor drive system and a motor built-in reducer used for the system, by which problems resulting from vibration, noise, or pulsation in conveyors are eliminated.

To solve the above problems, the present invention provides a conveyor drive system including a motor, a reducer mechanically interconnected to the motor for transmitting rotation of the motor at a reduced rate to a drum for driving the conveyor, and a transmission unit for discretely transmitting output from the reducer to the drum. The transmission unit includes a driving rotary member, a driven rotary member, and an endless power transmission member trained over the driving rotary member and the driven rotary member, for discretely transmitting the output. The reducer is a simple planetary roller reducer having a sun roller, a plurality of planetary rollers in rolling contact with an outer periphery of the sun roller, and a ring roller, the planetary rollers being in contact with an inner periphery thereof. An output shaft of the reducer is connected to the driving rotary member of the transmission unit.

In known conveyors, generally, when one of the driving and driven sprockets (the driving rotary member and the driven rotary member) in the endless power transmission mechanism has too small a pitch circle diameter, the links of the chain trained over the sprockets (transmission unit) do not form a smooth arc but numerous sides of a polygon. As a result, the chain moves around the driving and driven sprockets as if discretely, making a rattling noise. This movement of the chain will be hereinafter referred to as a "polygonal motion" throughout this specification.

Such polygonal motion is most likely to occur in power transmission using a metal chain and sprockets, but it also can occur in a belt drive using a rubber or plastic timing belt. That is, for either a chain drive or a timing belt drive, as long as power is discretely (digitally) transmitted, the polygonal motion occurs in these types of power transmission. This phenomenon has not been considered a problem so far.

Recent use however of an inverter power supply with converting frequency which enables a variable speed drive of a motor has brought about a problem of unexpected noise from not only the chain but also from the geared motor and its neighboring constituents such as a bed on which the geared motor is placed, or supporting legs and bases. This noise is apparently caused by resonance between the chain or timing belt and the driving geared motor, which occurs at certain rpm of the motor.

The inventors have ascertained through research that this problem is likely to occur particularly when the chain sprocket has a small pitch circle diameter.

This finding indicates that the resonance occurs in association with the above-described "polygonal motion."

It is generally easy to take measures to suppress noise and vibration if the level of the noise and vibration is constant. It is however, not easy to take appropriate measures to prevent noise or vibration which is generated unexpectedly depending on the situation. This is because it is not desirable in terms of cost to provide measures taken to prevent such unexpected noise or vibration, which result in excessive quality during the majority of the operation period.

In the case where the resonance is presumably caused by the polygonal motion, the problem could be solved to some extent by increasing the diameter of the sprockets. However, it is possible that objects being transported on the conveyor belt are positioned beyond the conveyor belt edge. Therefore if the sprocket is to have a larger diameter, then the drum itself or the entire conveyor must be made large in order that the sprocket does not stick out from a side of the belt. These measures however increase the equipment costs and require more space to install the system. Another option to prevent the "polygonal motion" is to employ a flat smooth belt instead of a chain or a timing belt to perform analogue or seamless power transmission using friction.

However, the structure of the analogue power transmission does not allow a large torque to be transmitted, and accordingly the overall mechanism tends to be bulky. Also, the problem of slippage at the belt-to-pulley interface which is intrinsic to this mechanism makes it hard to perform feed-forward or feed-back control, and therefore precise positioning or control of speed is impossible.

The present invention presupposes the use of chains or timing belts and aims at solving the problems described above. The primary feature of the invention is that it employs a reducer of a simple planetary roller mechanism which performs traction transmission for the reducer interposed between the motor, which is the source of vibration and thus the source of resonance, and the chain or timing belt which cannot help but generate a polygonal motion. Data proving the effects of using traction transmission will be given later.

DESCRIPTION OF PREFERRED EMBODIMENTS

Figure 1:
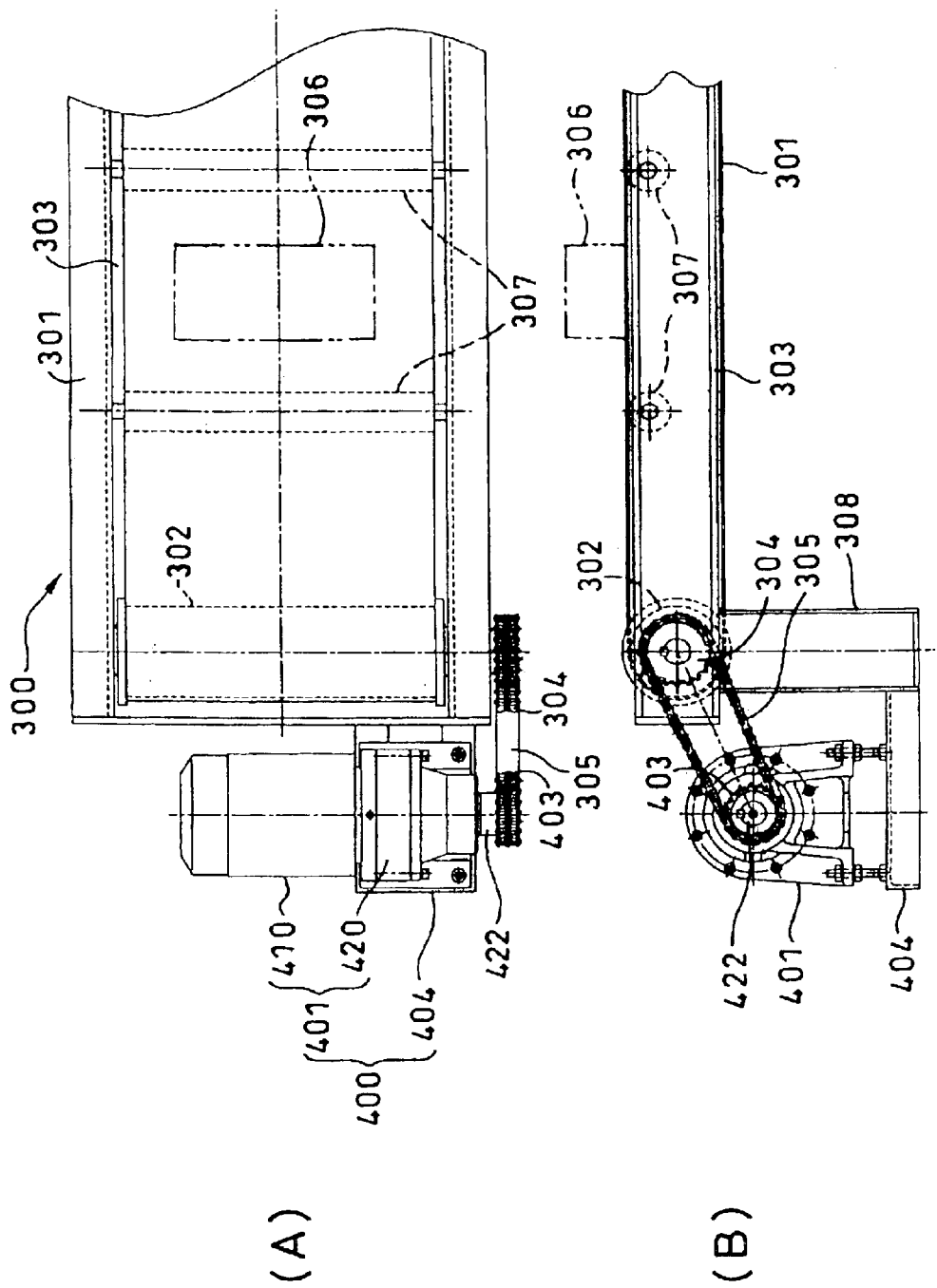
FIG. 1A is a top plan view and FIG. 1B is a front view of a conveyor and its belt drive system according to a first embodiment of the present invention.

Preferred embodiments of the present invention will be hereinafter described with reference to the accompanying drawings.

FIG. 1A is a plan view and FIG. 1B is a front view of a conveyor and a conveyor belt drive system according to one embodiment of the present invention, in which the reference numeral 300 denotes the conveyor and the reference numeral 400 denotes the drive system.

The conveyor 300 includes a bed 301, a pair of drums 302 rotatably supported at both ends of the bed 301, and an endless conveyor belt 303 trained over both drums 302. The drawings illustrate only one end of the bed 301 and one of the drums 302. A driven sprocket 304 is coupled to the shaft of the illustrated drum 302, so that the drum 302 is driven by a motor built-in reducer 401 (to be described later) via a chain 305 trained over the driven sprocket 304. The reference numerals 306, 307, and 308 in the drawings represent an object being transported, rollers, and a support leg, respectively.

The drive system 400 includes a planetary roller-type, motor built-in reducer 401 having an output shaft 422 to which a drive sprocket 403 is mounted. The endless chain 305 is trained over this drive sprocket 403 and the driven sprocket 304 of the conveyor 300. The reference numeral 404 represents a base. The support legs 308 of the conveyor 300 are joined to this base 404.

As can be clearly seen from FIGS. 1A, 1B, 9A, and 9B, the drive sprocket 403 mounted to the output shaft 422 of the motor built-in reducer 401 and the driven sprocket 304 in the embodiment of the present invention are much reduced in their diameter compared to the prior art example. There is thus no risk of sprockets interfering with the objects 306 being transported. Since the drums 302 are also reduced in diameter, the entire conveyor 300 is made smaller and thinner.

Such reduction in the diameter of the drive sprocket 403, driven sprocket 304, and drums 302 can only be achieved by the application of the planetary roller mechanism for the motor built-in reducer 401.

Figure 2:
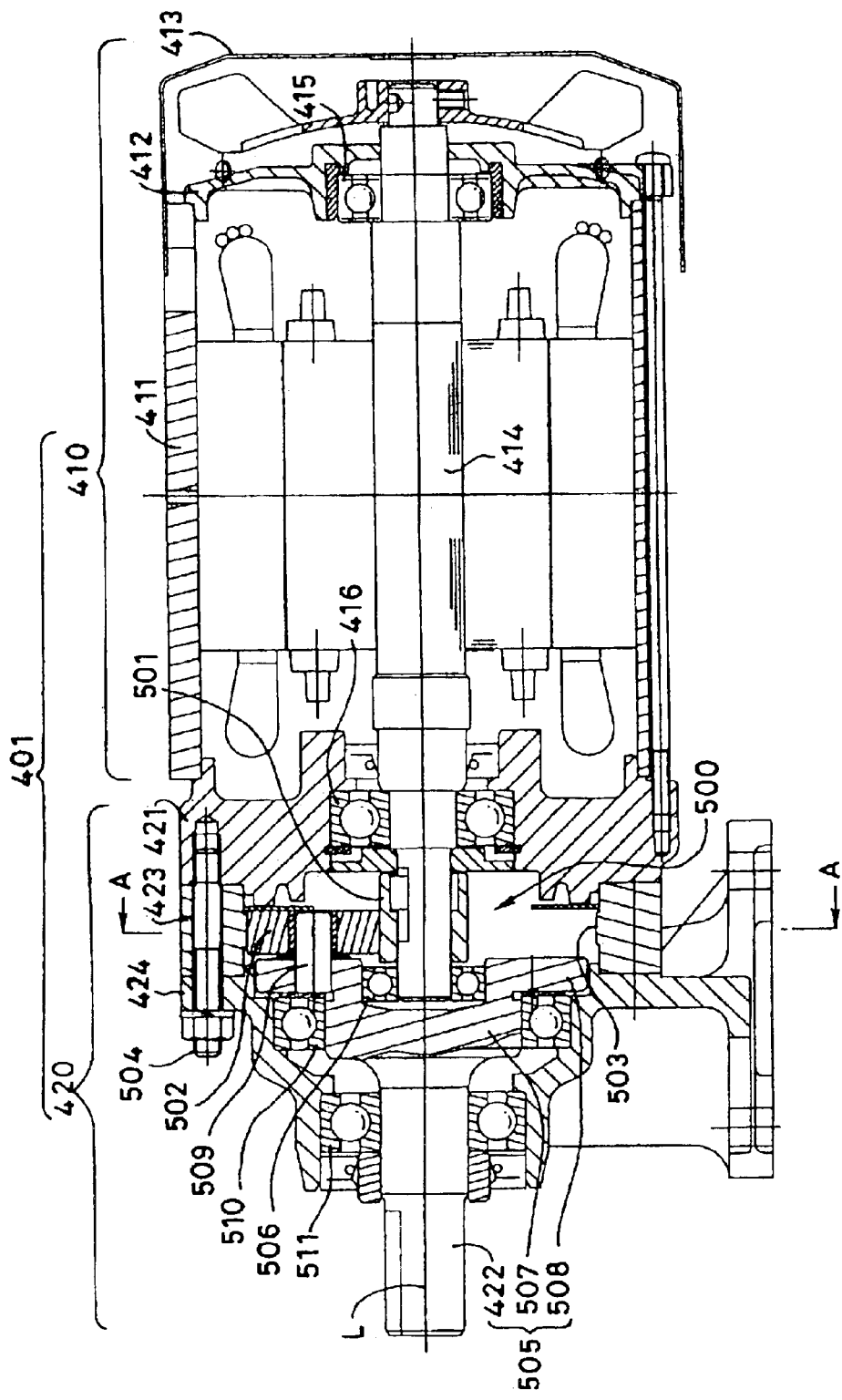
FIG. 2 is a cross section of a planetary roller-type, motor built-in reducer of the conveyor belt drive system.
Figure 3:
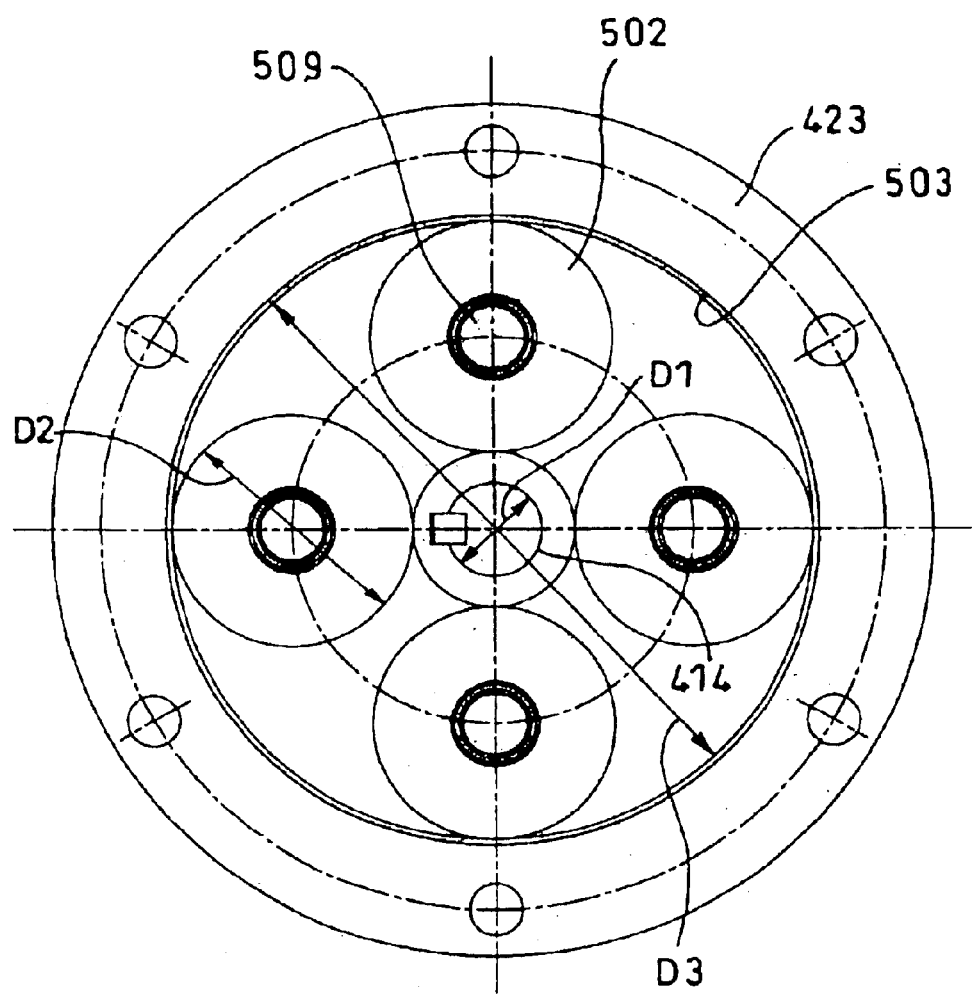
FIG. 3 is a cross section taken along the line A—A of FIG. 2.

FIG. 2 is a cross section of the planetary roller-type, motor built-in reducer 401 constituting the conveyor drive system of the present invention, and FIG. 3 is a cross section taken along the line A—A of FIG. 2. The reduction gear set 401 comprises a motor 410 and a simple planetary roller-type reducer (hereinafter referred to as a reduction gear unit) 420. Rotation of the motor 410 is transmitted to the reduction gear unit 420 through the motor shaft 414. The reduction gear unit 420 rotates its output shaft 422 at a reduced speed according to a predetermined reduction ratio, using a mechanism called traction drive, in which shear stress of traction oil is utilized to transmit power.

The motor 410 consists of a cylindrical casing 411 and a stator and other elements accommodated therein. The rear end of the cylindrical casing 411 on the opposite side of the reduction gear unit 420 is closed by a rear cover 412, and on the rear end side of this cover is attached a fan cover 413. A rear bearing 415 is fitted in the rear cover 412, and a front bearing 416 is fitted in a coupling casing 421 that interconnects the motor 410 to the reduction gear unit 420. The motor shaft 414 (or driving shaft, rotating shaft) is supported at both ends by these bearings 415, 416 and is coaxial with the center line L of the reduction gear unit 420.

The casing of the reduction gear unit 420 is made up of three parts: a center casing 423 disposed in an axially central position, the coupling casing 421 mentioned above connecting the reduction gear unit 420 to the motor 410, and a front casing 424 on the opposite side of the motor 410. The coupling casing 421 of the reduction gear unit 420 doubles as the casing of part of the motor 410 so that the reduction gear unit 420 and the motor 410 are joined together through this coupling casing 421. A simple planetary roller mechanism 500 that performs the traction transmission is mounted inside a space defined by the center casing 423, coupling casing 421, and front casing 424.

The simple planetary roller mechanism 500 includes a sun roller 501 serving as a friction (or traction) roller, a plurality of (four in this example) hollow cylindrical planetary rollers 502 in rolling contact with the outer periphery of the sun roller 501. The inner periphery 503 of the center casing 423 functions as a ring roller, and the planetary rollers 502 are in contact therewith as shown in FIG. 3.

The ring roller or the inner periphery 503 of the center casing 423 has an inner diameter D3 slightly smaller than the sum of the diameter D1 of the sun roller 501 and the double of the diameter D2 of the planetary rollers 502, so as to apply pressure between the sun roller 501 and planetary rollers 502. The ring roller or the center casing 423 is a stationary element of the simple planetary roller mechanism 500, and so the center casing 423 is fixed to the coupling casing 421 with a through bolt 504. The sun roller 501 is an input element, and a carrier 505 supporting the planetary rollers 502 is an output element of the mechanism.

The carrier 505 includes four pins 509 each inserted in the planetary rollers 502, so that the revolving motion of the planetary rollers 502 around the sun roller 501 is transmitted to the carrier 505. The output shaft 422 of the reduction gear unit 420, a base part 507 in which is encased a bearing 506 for supporting the distal end of the motor shaft 414, and a flange 508 protruding outwardly from the base part 507 are all interconnected to each other and they all together function as the carrier 505. The output shaft 422 is rotatably supported by bearings 510 and 511 inside the front casing 424.

How the reduction gear unit 420 works will be briefly described below.

Rotation of the motor shaft 414 is transmitted to the sun roller 501 of the simple planetary roller mechanism 500. The planetary rollers 502 rotate around their axes and revolve around the sun roller along the inner periphery 503 of the center casing 423, and their revolving motion around the sun roller is transmitted through the carrier 505 and output from the output shaft 422 which is part of the carrier 505. The reduction ratio x1 of such simple planetary roller mechanism 500 can be expressed as x1=D1/(D1+D3), where D1 is the diameter of the sun roller 501 and D3 is the inner diameter of the ring roller (inner periphery 503 of the center casing 423).

In the power transmission described above in which a chain drive using the chain 305 and sprockets 304, 403 and the planetary roller-type, motor built-in reduction gear set 401 are combined, there is hardly any noise or vibration caused by resonance between the polygonal motion of chain and the reducer 401, while stable and reliable torque transmission is achieved.

Figure 4:
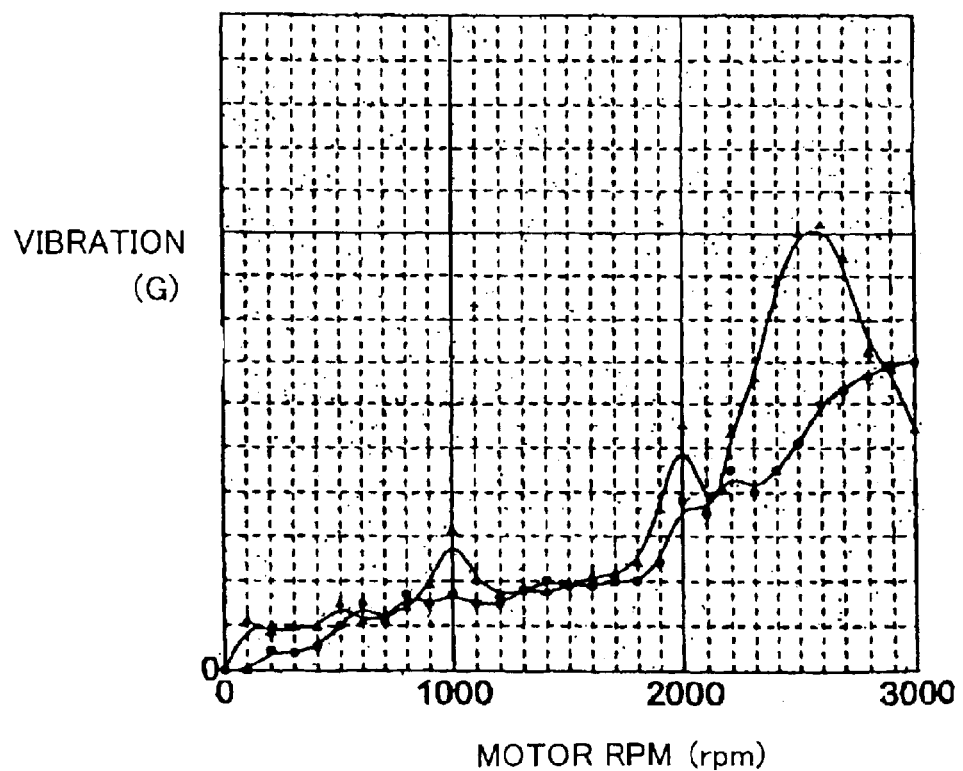
FIG. 4 is a graph showing the results of an experiment in which the present invention is compared to a prior art conveyor and its belt drive system.

FIG. 4 is a plot of vibration (G) versus motor rpm showing a result of an experiment in which the system of the present invention is compared to the prior art conveyor drive system shown in FIGS. 9A and 9B.

The curve plotted with solid circular marks represents the case with the present invention, while that with solid triangular marks represents the case with the prior art. The graph clearly shows that vibration and resonance are both much reduced in the system of the present invention as compared to the prior art.

Figure 9:
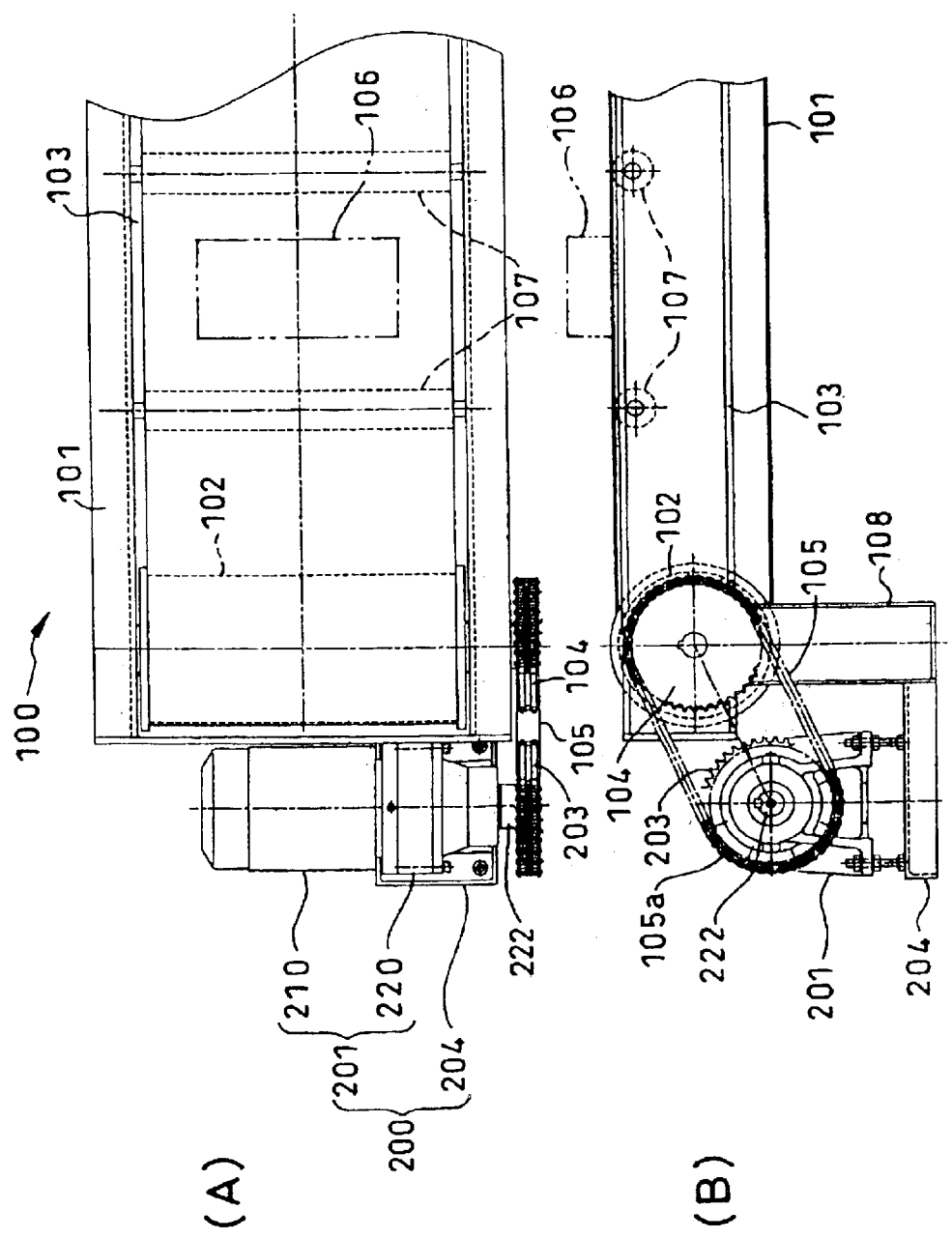
FIG. 9A is a top plan view and FIG. 9B is a front view of a prior art conveyor and its belt drive system.

The horizontal axis represents rotation per minute (rpm) of the motor accelerated by frequency-converted inverter power supply, and the vertical axis displays vibration acceleration (G) at a point indicated at x in FIGS. 1 and 9. In order to make the results more evident, the motor built-in reducer is directly placed on the base without vibration dumper rubber. For the motor, a 3-phase 4-pole motor (0.4 kw output) with a reduction ratio of 1:5 was used. The chain length was the same in both cases, while the diameter of the sprockets in the system of the present invention was made approximately a half of that of the prior art.

The following was observed in the systems used in the experiment:

In the case with the prior art, resonance occurred when the motor rpm was 900 to 1000, 1800 to 2000, and 2400 to 2700 between vibration caused by the "polygonal motion" and that caused by the engagement of toothed gears, resulting in a large vibration at the center of the motor built-in reducer, and noise was accordingly large. In the configuration according to the present invention, despite the use of smaller sprockets, no large vibration occurred over the whole range of the motor rpm.

Figure 5:
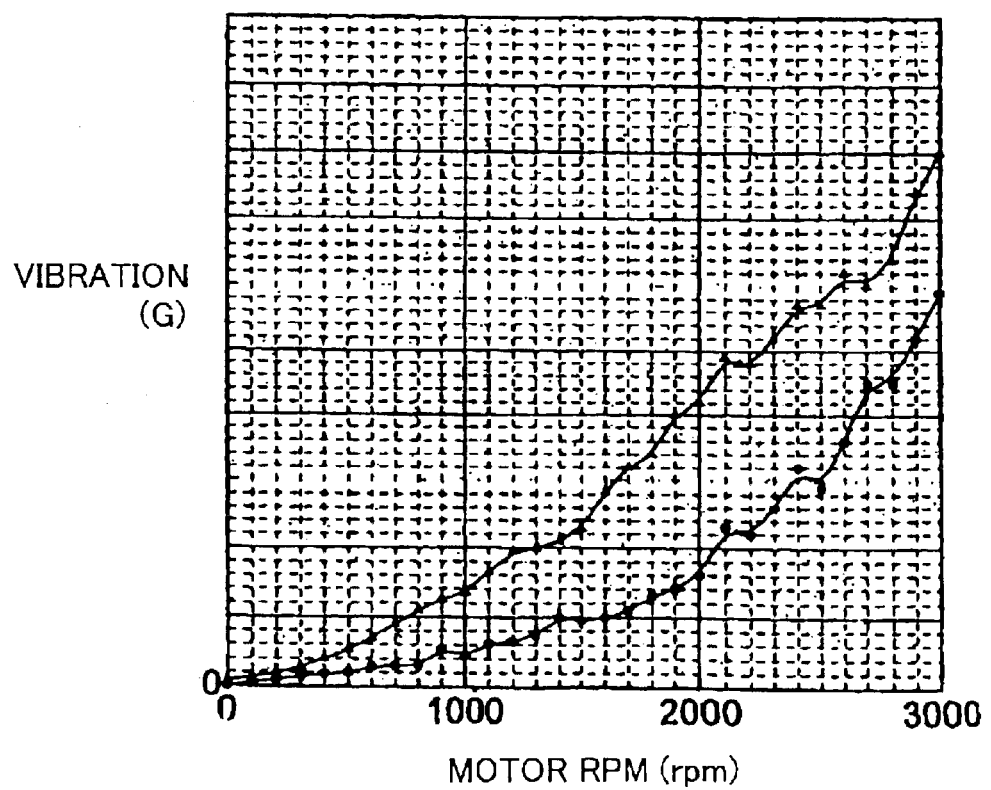
FIG. 5 is a graph showing the results of another experiment comparing the present invention to the prior art example.

FIG. 5 is a graph showing a result of another experiment comparing the system of the present invention with the prior art. In this experiment, vibration dumber rubber was provided under the base of the motor built-in reducer and the support legs of the conveyor. FIG. 5 shows a plot of vibration (G) versus motor rpm similarly to FIG. 4, in which the curve plotted with solid circular marks represents the case with the present invention, while that with solid triangular marks represents the case with the prior art. The graph clearly shows that vibration is much reduced over the whole range of the motor rpm in the system of the present invention as compared to the prior art.

According to the present embodiment, it is possible to eliminate resonance over the whole range of motor speed without resorting to increasing the pitch circle diameter of sprockets or the like for use with chains. Thus the above-mentioned driving rotary member of the transmission unit may have a pitch circle diameter greater than that of the driven rotary member by, for example, 1.4 times or more. A desired reduction ratio can be achieved by this difference in the diameters between two rotary members, whereby the motor built-in reducer can be made even smaller.

Furthermore, the simple planetary roller mechanism has a power inputting sun roller, a fixed ring roller, and a power outputting planet carrier. This configuration allows power from the motor shaft to be readily transmitted, and also allows the ring roller to be made integral with a casing, which contributes to the compactness of the mechanism. Furthermore, since planetary rollers transmit power by revolving around the sun roller while rotating around their own axes, vibration from the motor side and the chain side is effectively shut out.

Figure 6:
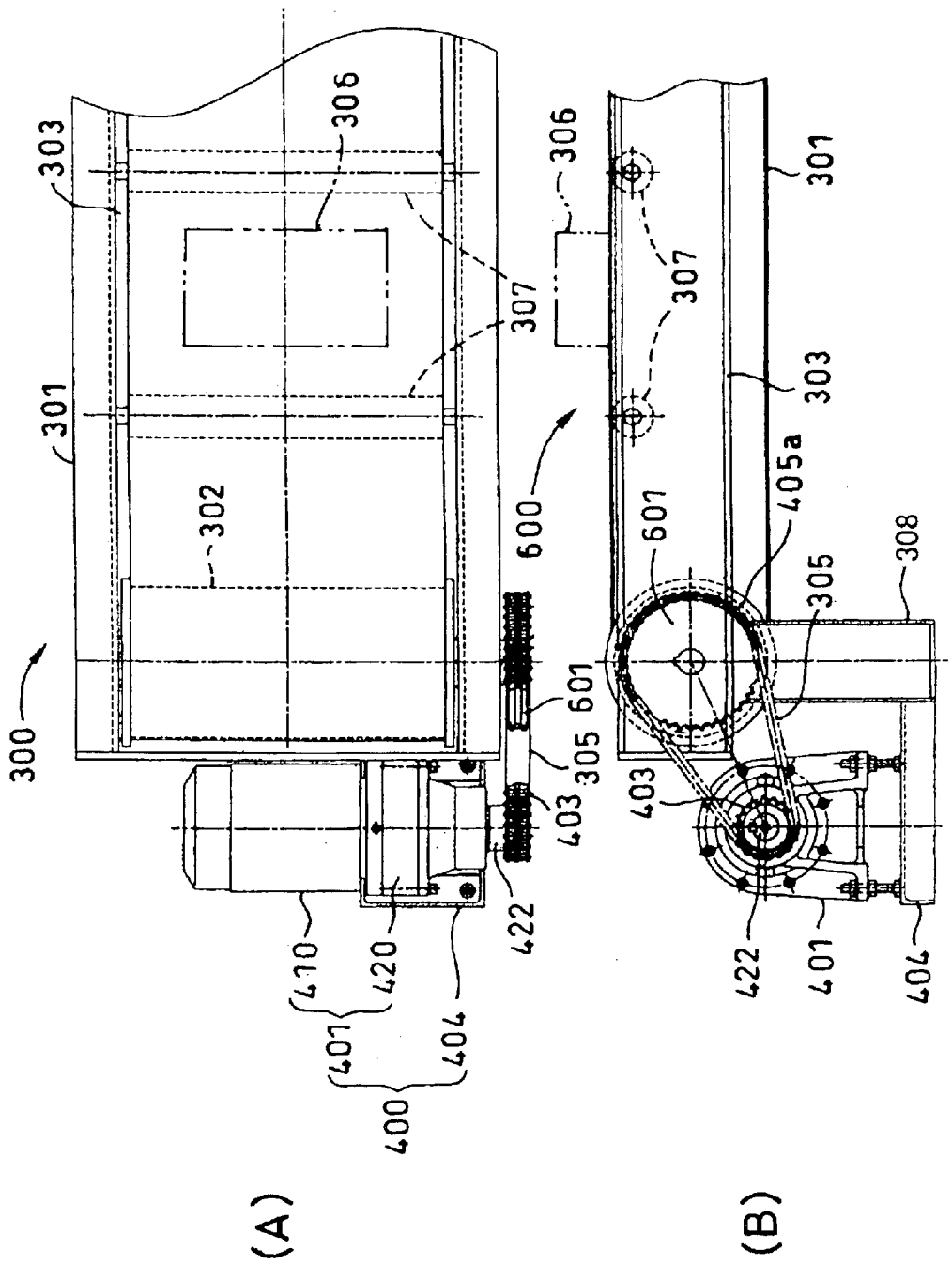
FIG. 6A is a top plan view and FIG. 6B is a front view of a conveyor and its belt drive system according to a second embodiment of the present invention.

FIG. 6A is a top plan view and FIG. 6B is a front view of a conveyor and a conveyor belt drive system according to a second embodiment of the present invention. In the description of the following various other embodiments, parts or elements identical or similar to those of the first embodiment shown in FIGS. 1 through 3 are given the same reference numerals, and the description thereof will be omitted. Only the parts different from the first embodiment are given different numerals and will be explained.

The conveyor 600 in this embodiment differs from the conveyor 300 of the previous embodiment in that its driven sprocket 601 is as large as the one in the prior art shown in FIGS. 9A and 9B. That is, only the drive sprocket 403 is reduced in diameter, while the driven sprocket 601 is the same size as that of the prior art, whereby speed is reduced, i.e., torque is increased, by the power transmission by the chain 305. Thereby the motor built-in reducer 401 can be made smaller, lighter, and more compact. The more compact the motor built-in reducer 401 is, the less vibration occurs. Therefore smaller reducers 401 will contribute to a further reduction in vibration in the whole system.

Figure 7:
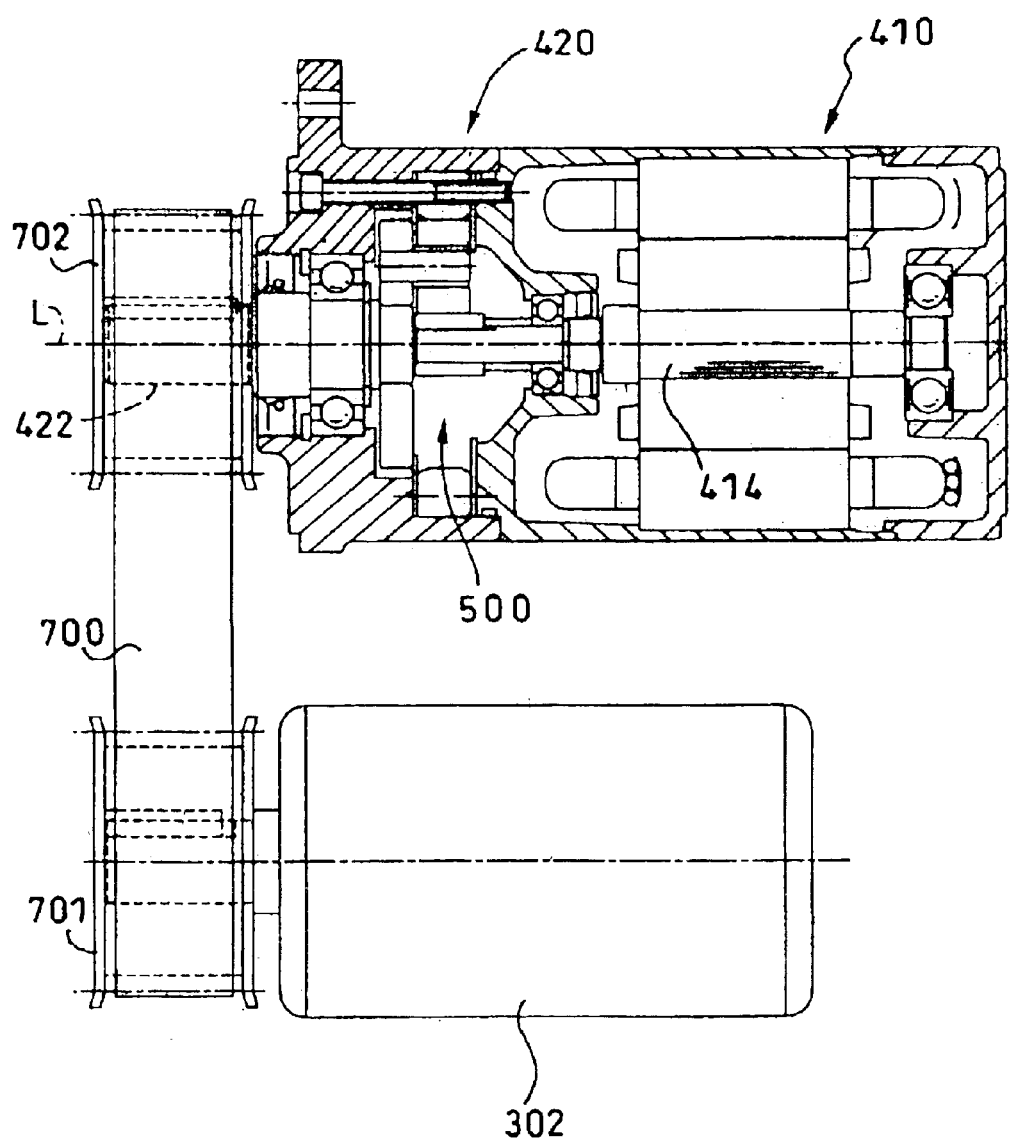
FIG. 7 is a cross section of a conveyor and its belt drive system according to a third embodiment of the present invention.

FIG. 7 is a cross section of a conveyor and a conveyor belt drive system according to a third embodiment of the present invention. In this embodiment, instead of the chain 305 for transmitting driving power, a toothed timing belt 700 made of rubber or plastic is employed. In order to install the timing belt 700, a toothed driven belt pulley 701 and a toothed driving belt pulley 702 are used in place of the driven sprocket 304 and drive sprocket 403.

Figure 8:
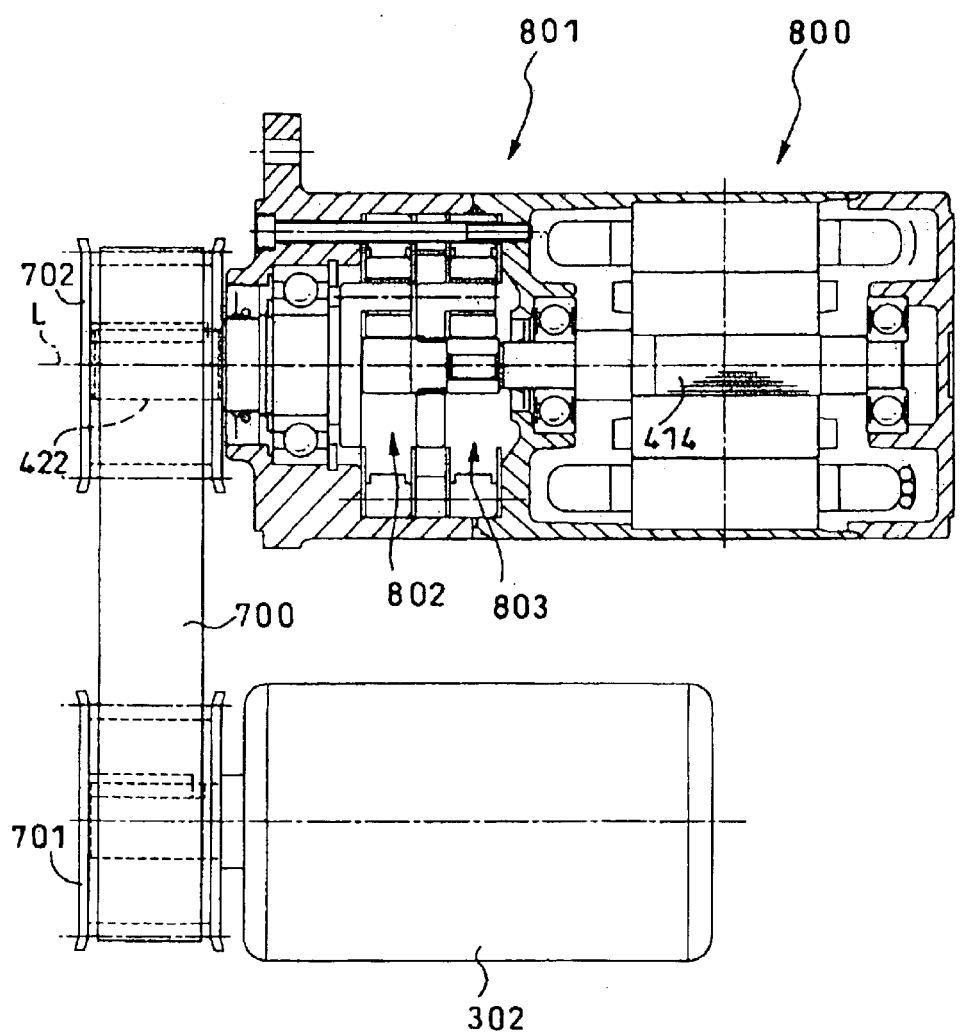
FIG. 8 is a cross section of a conveyor and its belt drive system according to a fourth embodiment of the present invention.

FIG. 8 is a cross section of a conveyor and a conveyor belt drive system according to a fourth embodiment of the present invention. This embodiment employs the belt and pulley structure as the previous embodiment shown in FIG. 7. In addition, two sets of simple planetary roller mechanisms 802 and 803 are equipped in the reduction gear unit 801 constituting the motor built-in reducer 800, thereby enabling to achieve a wider range of reduction ratio.

As described above, the conveyor and the conveyor belt drive system using a chain or a timing belt and a motor built-in reducer according to the present invention employs a simple planetary roller-type, motor built-in reducer as the power source. This eliminates resonance resulting from a polygonal motion of the chain or timing belt as it runs around the sprockets or pulleys while bending. The noise is thereby much reduced and also the system is made more compact.

What is claimed is:

1. A conveyor drive system comprising:

a motor;

a reducer mechanically interconnected to the motor for transmitting rotation of said motor at a reduced rate to a drum for driving the conveyor; and a transmission unit for transmitting output from the reducer to the drum, including a driving rotary member, a driven rotary member, and an endless power transmission member trained over the driving rotary member and the driven rotary member, for discretely transmitting the output, said reducer being a simple planetary roller reducer having a sun roller, a plurality of planetary rollers in rolling contact with an outer periphery of said sun roller, and a ring roller, said planetary rollers being in contact with an inner periphery of the ring roller, an output shaft of said reducer being connected to said driving rotary member of said transmission unit, wherein the reducer is operably connected to the motor and transmission unit to reduce harmonic vibrations in the conveyor drive system.

2. The conveyor drive system according to claim 1, wherein said transmission unit comprises a chain and chain sprockets.

3. The conveyor drive system according to claim 1, wherein said transmission unit comprises a timing belt and timing pulleys.

4. The conveyor drive system according to claim 1, wherein a ratio of a pitch circle diameter of said driving rotary member of said transmission unit to a pitch circle diameter of the driven rotary member is 1.4 or more.

5. The conveyor drive system according to claim 1, wherein said simple planetary roller reducer has a power inputting sun roller, a fixed ring roller, and a power outputting carrier connected to the planetary rollers.

6. A motor built-in reducer for the conveyor drive system according to claim 1, comprising said motor and said simple planetary roller reducer set mechanically interconnected to the motor to be united with each other.

* * * * *